United States Patent
Takahashi (10) Patent No.: US 8,473,007 B2
(45) Date of Patent: Jun. 25, 2013

(54) IC CARD THAT DISCARDS PROACTIVE COMMAND AT PREDETERMINED TIMING AND RESUMES TRANSMISSION OF PROACTIVE COMMAND AFTER INITIALIZATION

(75) Inventor: Atsushi Takahashi, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 10 days.

(21) Appl. No.: 13/227,644

(22) Filed: Sep. 8, 2011

(65) Prior Publication Data

US 2012/0238322 A1 Sep. 20, 2012

(30) Foreign Application Priority Data

Mar. 17, 2011 (JP) ................. 2011-059914

(51) Int. Cl.
*H04B 1/38* (2006.01)
(52) U.S. Cl.
USPC .......... 455/558; 455/556.1; 455/556.2; 455/418; 455/412.1; 455/425; 379/433.09
(58) Field of Classification Search
USPC ......... 455/411, 418–420, 558, 458, 425, 455/525, 574, 423, 412.1, 414.1, 550.1, 556.2, 455/556.1; 379/433.09
See application file for complete search history.

(56) References Cited

U.S. PATENT DOCUMENTS 6,501,962 B1 * 12/2002 Green ................... 455/558
2007/0207798 A1 * 9/2007 Talozi et al. ............ 455/423

FOREIGN PATENT DOCUMENTS

CN 101820613 9/2010
EP 1 359 524 A1 11/2003

OTHER PUBLICATIONS

ETSI 102 241 Ver 9.1.0, European Telecommunications Standards Institute (May 2011); Section 4.1, UICC Java Card architecture, p. 9.
ETSI 102 223 Ver 10.3.0, European Telecommunications Standards Institute (May 2011); Annex D and Annex E, Terminal Display in proactive UICC session & Help Information feature processing, p. 183-184.
Search Report and Written Opinion dated Aug. 30, 2012 issued in corresponding Singapore Application No. 2011-06595-0.

* cited by examiner

*Primary Examiner* — Vladimir Magloire
*Assistant Examiner* — Babar Sarwar
(74) *Attorney, Agent, or Firm* — Posz Law Group, PLC (57) ABSTRACT

According to one embodiment, an IC card, which interprets and executes a command instruction from an external device, and returns the execution result as a response, includes a command generation unit configured to generate a request command which requests the external device to execute a specific operation in response to a specific command instruction from the external device, a storage unit configured to store the generated request command in a memory, a notification unit configured to notify the external device of generation of the request command when a response to the specific command instruction is sent, and notify the external device of the request command when the external device instructs to fetch the request command, and a discard unit configured to discard the request command in the storage unit when the external device instructs to discard the request command.

3 Claims, 6 Drawing Sheets

IC CARD THAT DISCARDS PROACTIVE COMMAND AT PREDETERMINED TIMING AND RESUMES TRANSMISSION OF PROACTIVE COMMAND AFTER INITIALIZATION

CROSS-REFERENCE TO RELATED APPLICATIONS

This application is based upon and claims the benefit of priority from prior Japanese Patent Application No. 2011-059914, filed Mar. 17, 2011, the entire contents of which are incorporated herein by reference.

FIELD

Embodiments described herein relate generally to an IC card.

BACKGROUND

Many foreign countries adopt a GSM® (Global System for Mobile communications) system as a mobile phone system. In the GSM® system, a SIM (Subscriber Identity Module) card as one kind of IC cards is indispensable in a mobile phone.

In Japan, a mobile phone system, which adopts a 3GPP (3rd Generation Partnership Project) standard in place of the GSM®, has been launched. In the 3GPP standard as well, a USIM (Universal Subscriber Identity Module) card as an IC card similar to the SIM card is indispensable.

The SIM and USIM cards used in the GSM® and 3GPP are inserted in mobile phone terminals. The SIM and USIM cards record key information, encryption algorithms, and various network parameters required to establish connections to communication networks of telecommunications carriers. Each mobile phone terminal sends these pieces of information to an OTA (Over The Air) server, authentication/management server, and the like of the telecommunications carrier, and executes authentication with these servers. When the authentication result is correct, the mobile phone terminal can receive communication services of that telecommunications carrier.

In standards (ETSI TS 102 223, ETSI TS 102 241), specifications called CAT (Card Application Toolkit) are specified. The CAT is installed in a card (to be referred to as a UIM hereinafter) represented by the SIM, USIM, and UIM cards of IC cards, which are required to identify subscriber information of, for example, mobile phones. As one of the CAT specifications, a function called a Proactive command, which is required to send various operation requests and information from the UIM to a mobile phone (to be referred to as an ME hereinafter) or network server, is specified.

According to the standards, when an Applet called a Tool-Kit Applet or embedded software is executed in the UIM, a Proactive command send request is often generated in the UIM. At this time, the UIM sends a Proactive command as response data to a Fetch command sent from the ME. However, the UIM cannot output the Proactive command before the ME sends the Fetch command.

On the other hand, in the HIM, another Proactive command send request may be generated by an operation of the Applet independently of this state. For this reason, when a state in which the UIM does not receive any Fetch command (the ME does not send any Fetch command) is continued, unsent Proactive commands are accumulated in the UIM.

When the ME supplies a reset signal to the UIM, information of unsent Proactive commands is also reset. Hence, a Proactive command to be sent cannot often be sent.

Therefore, there is a need for preventing data to be sent to the ME, which is generated by a specific command in the UIM, from being accumulated while being kept unsent, or preventing data to be sent to the ME, which is generated by a specific command, from being erased involuntarily.

DETAILED DESCRIPTION

In general, according to one embodiment, an IC card, which interprets and executes a command instruction from an external device, and returns the execution result as a response, comprises: a command generation unit configured to generate a request command which requests the external device to execute a specific operation in response to a specific command instruction from the external device; a storage unit configured to store the generated request command in a memory; a notification unit configured to notify the external device of generation of the request command when a response to the specific command instruction is sent, and notify the external device of the request command when the external device instructs to fetch the request command; and a discard unit configured to discard the request command in the memory when the external device instructs to discard the request command.

First Embodiment

Figure 1:
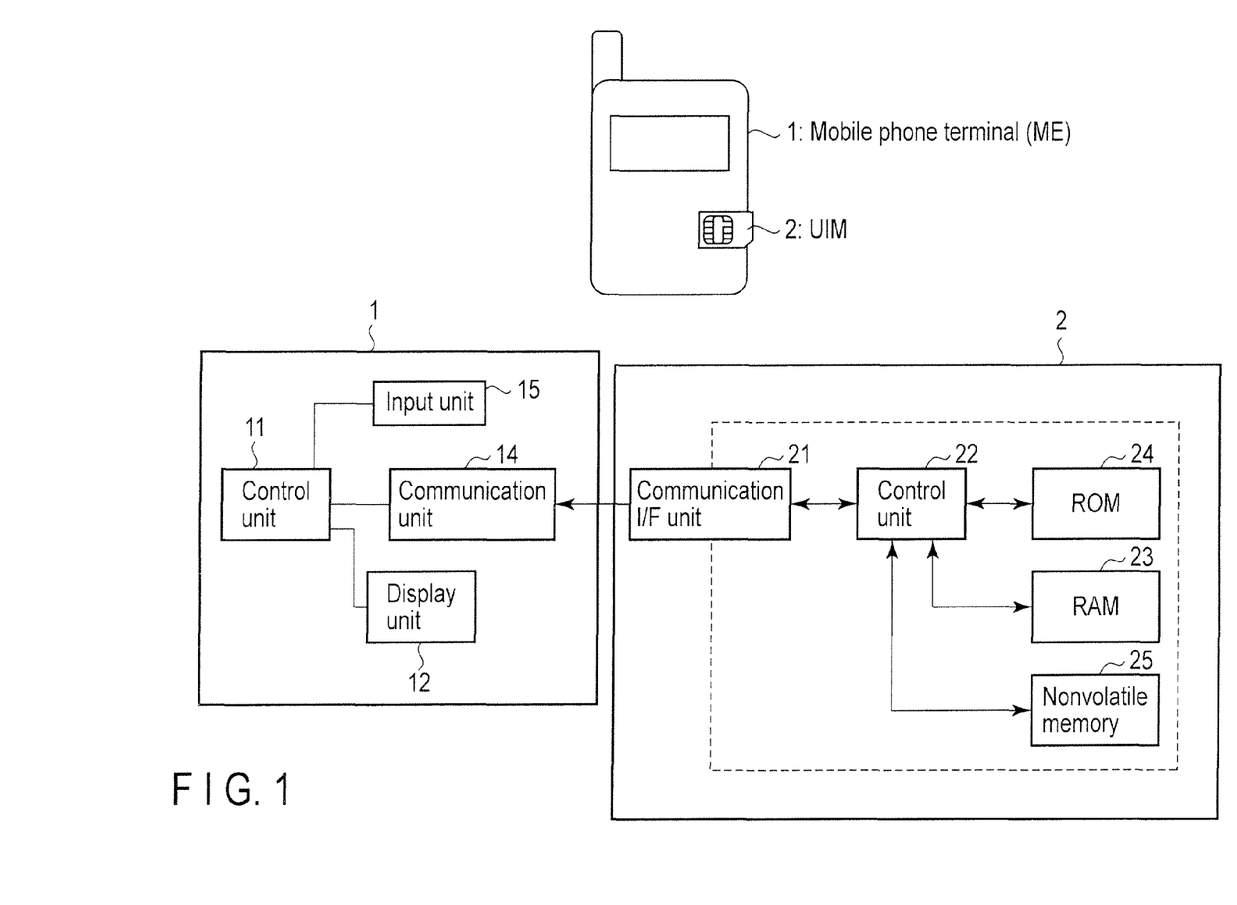
FIG. 1 is an exemplary block diagram showing the connection and arrangements of an ME and UIM according to the first embodiment.

FIG. 1 is a block diagram showing the connection and arrangements of a mobile phone terminal (ME) 1 and UIM 2 according to the first embodiment. The UIM 2 is a portable electronic device, and is attached to the ME 1 to handle data when a mobile phone application is used.

The ME 1 includes a control unit 11, display unit 12, communication unit 14, and input unit 15. The control unit 11 systematically controls the operations of the respective units in the ME 1. The display unit 12 displays information for the user. The communication unit 14 executes data communications with the UIM 2. The input unit 15 inputs instructions from the user.

The UIM 2 includes a communication interface (I/F) unit 21, control unit 22, RAM 23, ROM 24, and nonvolatile memory 25.

The communication I/F unit 21 receives data sent from the ME 1, and outputs the received data to the control unit 22. The control unit 22 executes arithmetic operations and control, and systematically controls the UIM 2. The ROM 24 is a read-only memory. The ROM 24 stores basic software such as an operating system (OS), applications, and data. The RAM 23 is used as a work area in the processing of the control unit 22. The nonvolatile memory 25 is a rewritable nonvolatile memory such as an EEPROM and flash memory, and is normally used as a work area and program area of the user. An Applet to be described later is stored in the nonvolatile memory 25.

Figure 2:
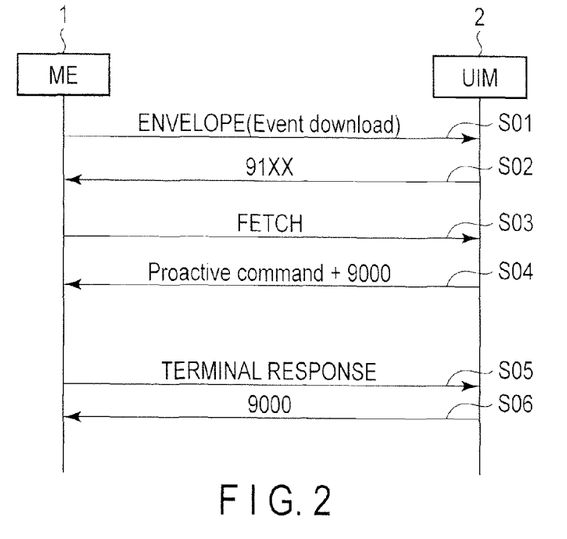
FIG. 2 is an exemplary chart showing normal command exchange procedures between the ME and UIM according to the first embodiment.

FIG. 2 is a chart showing normal command exchange procedures between the ME 1 and UIM 2 according to the first embodiment.

In step S01, the ME 1 sends an Envelope command to the UIM 2. In this case, a plurality of types of formats are specified in the Envelope command by the aforementioned standards. "Eventdownload" is one of these formats, and has contents which notify the UIM 2 of generation of a predetermined event in the ME 1.

In the UIM 2, an Applet corresponding to the received Envelope command is launched, and a program described in the Applet is executed. In this case, when the UIM 2 causes the ME 1 to take an arbitrary action, for example, when the UIM 2 causes the ME 1 to execute processing for displaying a screen on the display unit 12 of the ME 1, a Proactive command which designates screen display processing has to be sent to the ME 1. Hence, in step S02, the UIM 2 sends a status word "91XX" to the ME 1. This status word "91XX" represents a Proactive command send request. That is, this status word represents that there is a Proactive command to be sent in the UIM 2.

Upon reception of the status word "91XX", the ME 1 outputs a Fetch command to the UIM 2 in step S03. Upon reception of the Fetch command, the UIM 2 sends a Proactive command and status word "9000" to the ME 1 in step S04. Upon reception of the Proactive command, the ME 1 executes processing corresponding to that Proactive command. For example, the ME 1 executes an operation for outputting sound, displaying a screen, originating a phone call, or the like.

In step S05, the ME 1 outputs an execution result to the UIM 2 as a Terminal Response. For example, the ME 1 returns a response indicating that execution of the processing is complete, the processing cannot be executed since a user's operation is in progress, execution of the processing is interrupted due to occurrence of an error, or the like. In step S06, the UIM 2 executes subsequent processing according to the program of the Applet. When there is no subsequent Proactive command to be processed by the Applet, the UIM 2 sends a status word "9000".

Next, procedures executed when a Proactive command cannot be normally sent and is accumulated will be described below.

Figure 3:
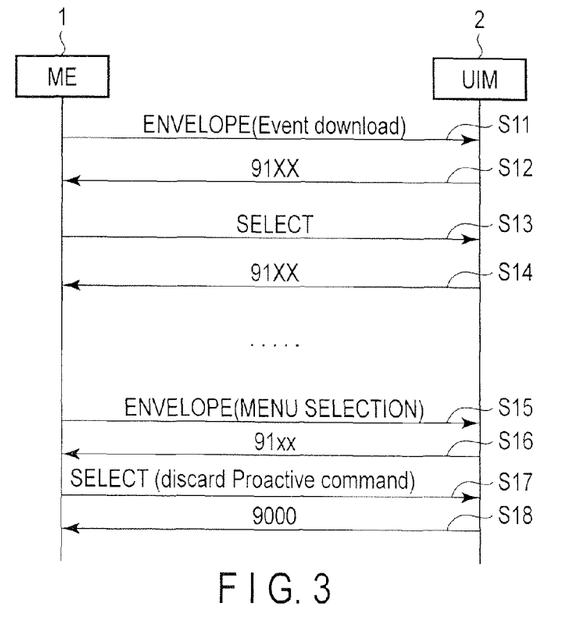
FIG. 3 is an exemplary chart showing communication procedures required to discard accumulated Proactive commands between the ME and UIM according to the first embodiment.

FIG. 3 is a chart showing communication procedures required to discard accumulated Proactive commands between the ME 1 and UIM 2 according to the first embodiment.

In step S11, the ME 1 sends an Envelope (Event Download) command. The UIM 2 launches the Applet using reception of this command as a trigger. Then, the UIM 2 sends a status word (SW)=91XX indicating that there is a Proactive command to be sent in step S12. The processes executed so far are the same as those in the procedures described using FIG. 2.

Normally, the ME 1 sends a Fetch command to the UIM 2. However, when the ME executes processing which cannot send any Fetch command, the Fetch command is not sent to the UIM 2, and another command associated with the processing in execution is sent. In step S13, the ME 1 sends a Select command. The UIM 2 receives the Select command, and normally executes processing. Next, the UIM 2 checks whether or not there is a Proactive command to be sent every time a command is sent. Since there is an unsent Proactive command, the UIM 2 sends SW=91XX in step S14.

After that, the ME 1 does not send a Fetch command, and sends another Envelope (Menu Selection) command different from that in step S11 to the UIM 2 in step S15. The UIM 2 launches the Applet using this Envelope command as a trigger. Then, the Applet issues a Proactive command send request to the UIM 2. In step S16, the UIM 2 sends SW=91XX to the ME 1.

In the aforementioned case, the two Proactive commands, that is, the Proactive command generated upon launching the Applet for the first time and that generated upon launching the Applet for the second time are accumulated in the UIM 2. In this way, after the Proactive command is received, when the ME 1 does not send any Fetch command for the reason on the ME 1 side, a state in which the Proactive commands are accumulated occurs in the UIM 2.

Next, a correspondence on the ME 1 side will be described below. For example, a case will be examined below wherein the user is executing an operation for inputting mail text in the ME 1. At this time, when a Proactive command is received, and a screen corresponding to that command is displayed, a function currently used by the user is temporarily interrupted, resulting in a quite inconvenient situation. Therefore, the ME 1 inhibits reception of the Proactive command at that time. That is, when the ME 1 is not ready to receive and process the Proactive command, the ME 1, which received SW=91XX from the UIM 2, can request the UIM 2 to discard the Proactive commands.

In step S17, the ME 1 sends a Select command which indicates discarding of the Proactive commands to the UIM 2. This Select command is sent in response to reception of SW=91XX in step S16 during execution of a predetermined job in the ME 1. When the command data indicates discarding of the Proactive commands, the UIM 2 discards the currently accumulated Proactive commands. Note that a method of discarding the Proactive commands can be designated by the Select command. For example, the Select command can designate to discard the oldest Proactive command or to discard all the accumulated Proactive commands. The PIM 2 discards the Proactive commands, and sends a status word in step S18. When there is no Proactive command, the PIM 2 sends SW=9000; when the Proactive command is left, it returns SW=91XX.

When the Proactive command discard instruction is issued, a command is sent as an I-block of a T-1 protocol, and its PCB field can indicate discarding of the Proactive commands.

Figure 4:
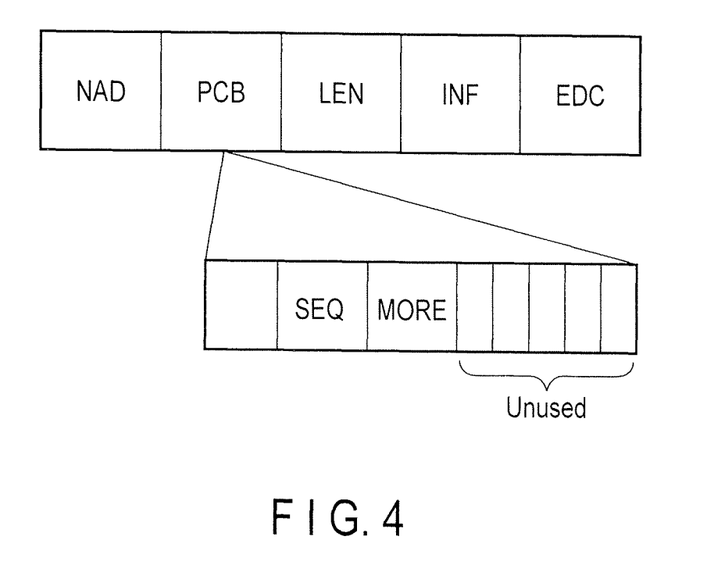
FIG. 4 is an exemplary view showing a T-1 protocol format according to the first embodiment.

FIG. 4 shows the T-1 protocol format according to the first embodiment.

In the T-1 protocol format (ISO07816), a command is configured by NAD, PCB, LEN, INF, and EDC fields. The NAD field represents an address. The PCB field represents a control code indicating a mode. The LEN field represents a length of the command. The INF field represents a type (Select, Proactive, etc.) of the command. The EDC field represents an error detection check code.

When the mode is "I-block", the PCB field is configured by 8 bytes, and right five bytes are unused. Hence, data indicating discarding of a command can be described in this unused data field.

Figure 5:
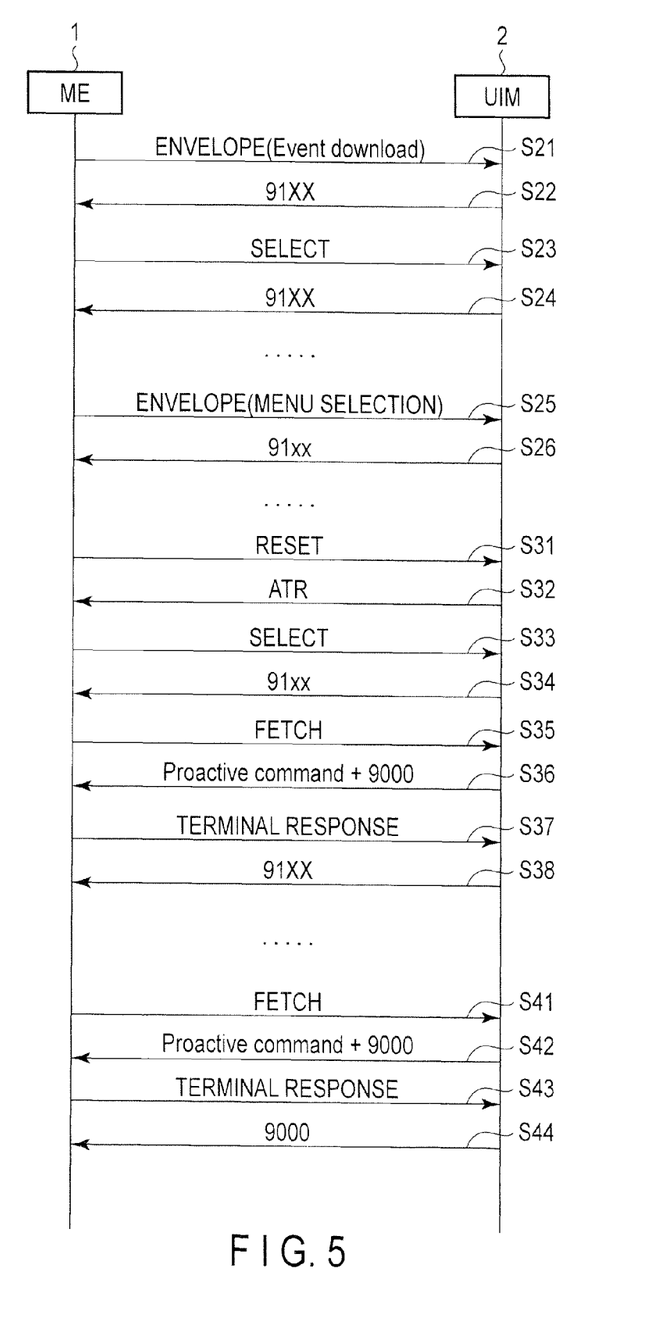
FIG. 5 is an exemplary chart showing communication procedures required to re-send accumulated Proactive commands between the ME and UIM according to the first embodiment.

FIG. 5 is a chart showing communication procedures required to re-send accumulated Proactive commands between the ME 1 and UIM 2 according to the first embodiment.

Since the procedures in steps S21 to S26 are the same as those in steps S11 to S16 shown in FIG. 3, a detailed description thereof will not be repeated.

When the ME 1 restarts reception of a Proactive command, it sends a Reset command to the UIM 2 in step S31. This Reset command is sent to initialize the UIM 2 when, for example, the power supply of the ME 1 is switched from OFF to ON. Therefore, the UIM 2 which received the Reset command clears the RAM 23. Conventionally, since a Proactive command is accumulated in the RAM 23, it is discarded. However, in this embodiment, since a Proactive command is accumulated in the nonvolatile memory 25, it is not discarded. In step S32, the UIM 2 returns ATR (answer to reset) as a response to the Reset command.

In step S33, the ME 1 sends a Select command. The UIM 2 receives the Select command, and normally executes processing. Next, the PIM 2 checks whether or not there is a Proactive command to be sent. Since the nonvolatile memory 25 accumulates the Proactive command to be sent, the PIM 2 sends SW=91XX to the ME 1 in step S34.

The ME 1 which received the status word "91XX" outputs a Fetch command to the UIM 2 in step S35. Upon reception of the Fetch command, the UIM 2 sends a Proactive command and status word "9000" to the ME 1 in step S36. The ME 1 which received the Proactive command executes processing corresponding to that Proactive command. For example, the ME 1 executes an operation for outputting sound, displaying a screen, originating a phone call, or the like.

In step S37, the ME 1 outputs an execution result to the UIM 2 as a Terminal Response. For example, the ME 1 returns a response indicating that execution of the processing is complete, the processing cannot be executed since a user's operation is in progress, execution of the processing is interrupted due to occurrence of an error, or the like. The UIM 2 which received the Terminal Response checks whether or not there is another Proactive command to be sent. If there is a Proactive command to be sent, the UIM 2 sends SW=91XX to the ME 1 in step S38.

After that, the UIM 2 repetitively executes the processes in steps S35 to S38 as many as the number of remaining Proactive commands.

In step S41, the ME 1 which received the status word "91XX" outputs a Fetch command to the UIM 2. Upon reception of the Fetch command, the UIM 2 sends a Proactive command and status word "9000" to the ME 1 in step S42. The ME 1 which received the Proactive command executes processing corresponding to that Proactive command. In step S43, the ME 1 outputs an execution result to the UIM 2 as a Terminal Response. Upon reception of the Terminal Response, the UIM 2 sends SW=9000 indicating that there is no Proactive command to be sent to the ME 1 in step S44.

According to the procedures described using FIGS. 3, 4, and 5, the Proactive commands can be discarded at a desired timing, and can be restarted after the reset operation.

The processing sequence of the UIM 2 required to implement the aforementioned communication procedures will be described below with reference to FIG. 6. Note that "UIM-control unit" shown in FIG. 6 indicates the control unit 22, and "UIM-Applet unit" indicates the Applet stored in the nonvolatile memory 25.

In step S50, the ME 1 sends a command. The UIM-control unit receives the command in step T01, and interprets the command in step T02. The UIM-control unit judges in step T03 whether or not the received command instructs to discard a Proactive command.

If the received command instructs to discard a Proactive command, the UIM-control unit discards the Proactive command accumulated in the nonvolatile memory 25 in step T04. Then, the process advances to step T05. If the received command does not instruct to discard a Proactive command, the UIM-control unit interprets the command in step T05. The UIM-control unit judges in step T06 whether or not execution of the Applet is required.

For example, in the aforementioned example, if the command is an Envelope or Fetch command, the UIM-control unit judges that execution of the Applet is required; if the command is a Terminal Response, it judges that execution of the Applet is not required.

If the UIM-control unit judges in step T06 that execution of the Applet is not required, it executes the command in step T10. The UIM-control unit checks in step T11 whether or not Proactive commands are accumulated in the nonvolatile memory 25.

If no Proactive command is accumulated in the nonvolatile memory 25, the UIM-control unit sets SW=9000 in step T12. If Proactive commands are accumulated in the nonvolatile memory 25, the UIM-control unit sets SW=91XX in step T13.

In step T14, the UIM-control unit sends a response. In step S51, the ME 1 receives the response.

If the UIM-control unit judges in step T06 that execution of the Applet is required, it executes the Applet in step P01, and interprets the command in step P02. The UIM-control unit checks in step P03 if the command is a Fetch command.

If the command is not a Fetch command, the UIM-control unit executes the Applet in step P04. The UIM-control unit judges in step P05 whether or not a Proactive command is required to be sent.

If a Proactive command is not required to be sent, the UIM-control unit sets SW=9000 in step T12. In step T14, the UIM-control unit sends a response.

If a Proactive command is required to be sent, the UIM-control unit stores the Proactive command in the nonvolatile memory 25 in step P06. In step T13, the UIM-control unit sets SW=91XX. In step T14, the UIM-control unit sends a response.

If the UIM-control unit determines in step P03 that the command is a Fetch command, it sets a Proactive command and SW=91XX in data to be sent in step P07. In step P08, the UIM-control unit deletes the Proactive command to be sent from the nonvolatile memory 25. In step T14, the UIM-control unit sends a response.

Figure 6:
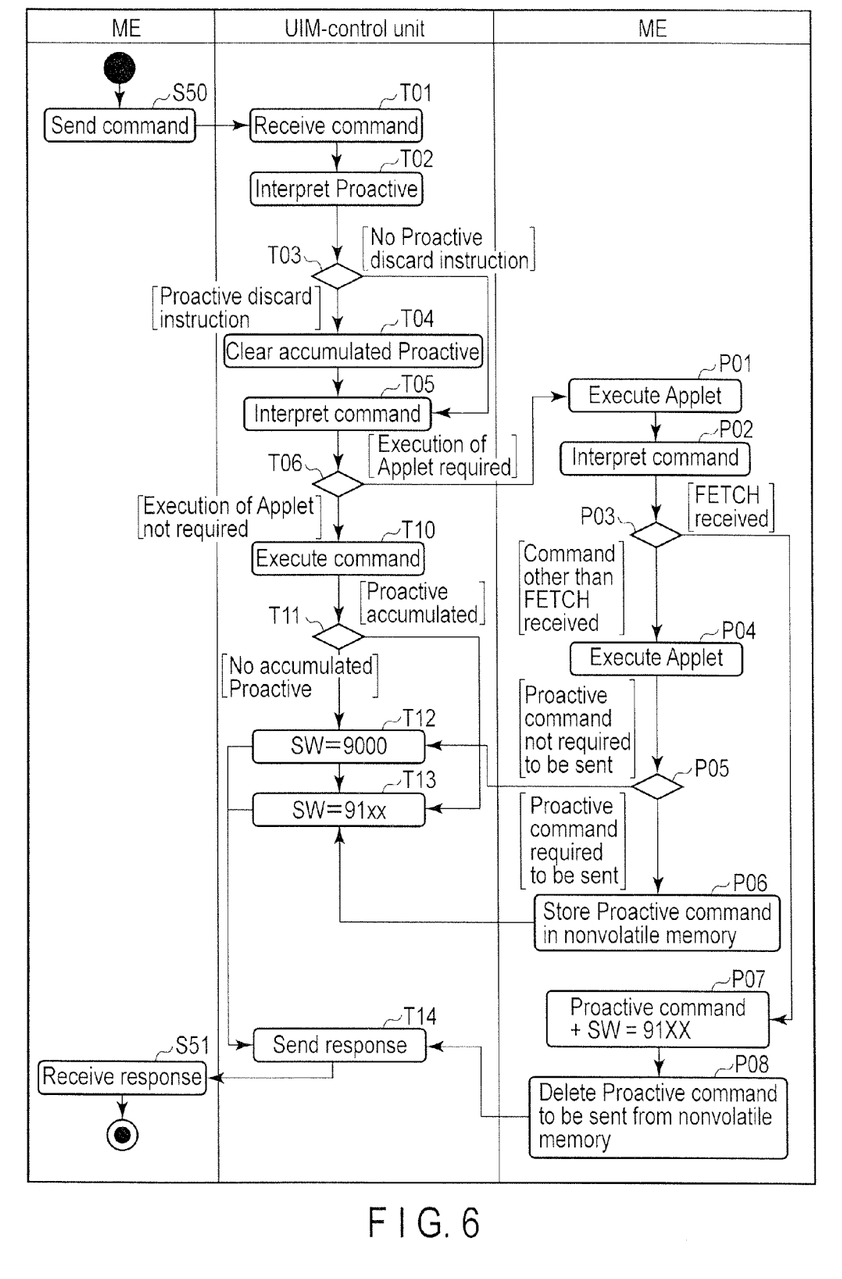
FIG. 6 is an exemplary flowchart showing the processing sequence of the UIM according to the first embodiment.

Note that in the flowchart shown in FIG. 6, if it is determined in step T03 that the received command instructs to discard a Proactive command, the Proactive command accumulated in the nonvolatile memory 25 is discarded in step T04. In this case, the oldest Proactive command may be discarded in place of all Proactive commands in the nonvolatile memory 25.

Note that the aforementioned UIM 2 is configured to be built in an IC card and to exchange data with a card reader/writer.

Figure 7:
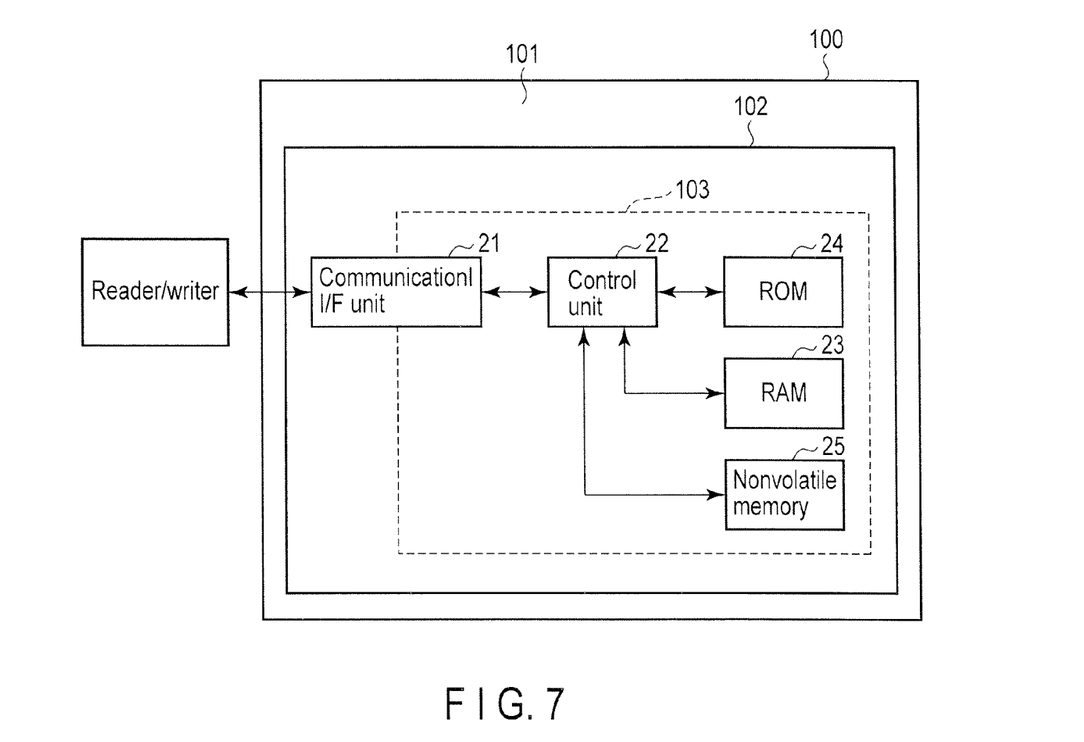
FIG. 7 is an exemplary block diagram for explaining an example of the arrangement of an IC card which incorporates the UIM according to the first embodiment.

FIG. 7 is a block diagram for explaining an example of the arrangement of an IC card 100 which incorporates the UIM of the first embodiment.

As shown in FIG. 7, the IC card 100 includes a card-like main body 101 formed of, for example, plastic, and an IC module 102 incorporated in the main body 101. The IC module 102 includes one or a plurality of IC chips 103 and a communication I/F unit 21. Each IC chip 103 and communication I/F unit 21 are embedded and formed in the IC module 102 while being connected to each other. The UIM of this embodiment can be configured as the IC module 102.

Note that the functions described in the aforementioned embodiment is configured using hardware. The functions can also be implemented by loading programs which describe the respective functions using software into a computer. The respective functions can be configured by selecting software or hardware as needed.

Note that the present invention is not limited to the aforementioned embodiment intact, and can be embodied by modifying components without departing from its scope and spirit when it is practiced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An IC card, which interprets and executes a command instruction from an external device, and returns the execution result as a response, comprising:
a command generation unit configured to generate a proactive command which requests the external device to execute a specific operation in response to a specific command instruction from the external device;
a storage unit configured to store the generated proactive command in a memory;
a notification unit configured to notify the external device of generation of the proactive command when a response to the specific command instruction is sent, to notify the external device of the proactive command when the external device instructs to fetch the proactive command, and to delete the proactive command from the memory;
a discard unit configured to discard the proactive command in the memory when the external device determines that reception and processing of the proactive command cause inconvenience, and an instruction to discard the proactive command is received from the external device; and
a reset unit configured to initialize the IC card when a command instruction which instructs to initialize is received from the external device,
wherein
the notification unit notifies the external device of generation of the proactive command when a command instruction other than the command instruction which instructs to discard the proactive command is received and when the proactive command is stored in the memory,
the reset unit does not discard any proactive command in the memory, and the notification unit is configured to notify the external device of the generation of the proactive command when the proactive command is in the memory.

2. The IC card according to claim 1, wherein the storage unit stores the generated proactive command in a nonvolatile memory.

3. An IC card comprising:
an IC module which includes a command generation unit configured to generate a proactive command which requests an external device to execute a specific operation in response to a specific command instruction from the external device;
a storage unit configured to store the generated proactive command in a memory; a notification unit configured to notify the external device of generation of the proactive command when a response to the specific command instruction is sent, to notify the external device of the proactive command when the external device instructs to fetch the proactive command, and to delete the proactive command from the memory; a discard unit configured to discard the proactive command in the memory when the external device determines that reception and processing of the proactive command cause inconvenient, and an instruction to discard the proactive command is received from the external device; and a reset unit configured to initialize the IC card when a command instruction which instructs to initialize is received from the external device; and
an IC card main body which houses the IC module,
wherein
the notification unit notifies the external device of generation of the proactive command when a command instruction other than the command instruction which instructs to discard the proactive command is received and when the proactive command is stored in the memory,
the reset unit does not discard any proactive command in the memory, and the notification unit is configured to notify the external device of the generation of the proactive command when the proactive command is in the memory.

* * * * *